Jan. 7, 1941.  R. BECK  2,227,994
THERMOMETER
Filed May 13, 1939
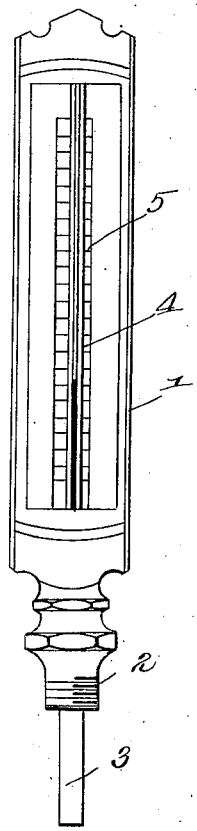
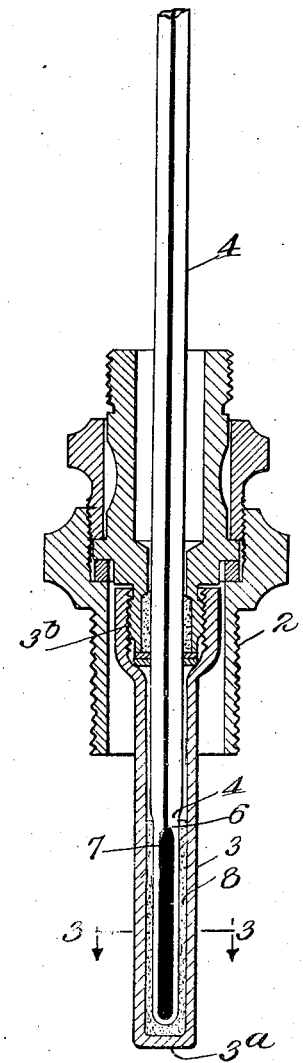
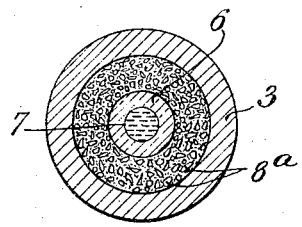
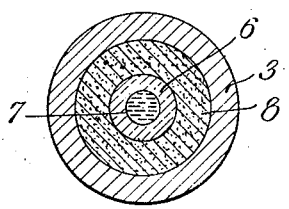
Inventor
Rudolf Beck,
by Roberts Cushman Woodberry
his Attys.

Patented Jan. 7, 1941

2,227,994

UNITED STATES PATENT OFFICE 2,227,994

THERMOMETER

Rudolf Beck, Fairfield, Conn., assignor to Manning, Maxwell & Moore, Incorporated, New York, N. Y., a corporation of New Jersey Application May 13, 1939, Serial No. 273,399

5 Claims. (Cl. 73—375)

This invention pertains to fluid-in-glass thermometers of the type commonly used for industrial purposes and in which the glass bulb of the thermometer proper is housed in a protective case, usually of metal. The invention relates more particularly to improved means for transferring heat between the housing or case and the thermometer bulb.

A protective housing or case is requisite, under some conditions of use, in order to shield the thin and fragile glass bulb from mechanical injury or from the effects of directly applied fluid pressure, the housing or case usually taking the form of a metal-walled cylindrical well which receives the bulb of the thermometer and usually the adjacent portion of the thermometer stem. Thermometer bulbs made in accordance with conventional methods are not accurately shaped or dimensioned, and though the protective metal housing may readily be made of an internal diameter which is accurate to 0.001 inch, the expected inaccuracy in bulb shape and dimensions is such that it is necessary to plan to make the bulb of somewhat lesser diameter than the well in order to allow for slight irregularities in the contour of the finished bulb. Accordingly, there is ordinarily an air space between the bulb and the wall of the well and, as air is not a good conductor of heat, there results a substantial lag in the response of the thermometer to variations in temperature in the wall of the housing.

To reduce this lag, it has been customary to fill the space between the bulb and the housing wall with mercury which, being a liquid, conforms readily to the irregularities of the bulb or housing wall and which is also a very good conductor of heat. However, it is not practicable to use mercury when the thermometer is to be employed for measuring temperatures above the boiling point of mercury (approximately 675° F.) for at or above that temperature the mercury is gradually vaporized.

While it is customary to pack asbestos or other appropriate material about the stem of the thermometer above the mercury in the well, it is not feasible to pack the asbestos very hard due to the fragile character of the glass. Furthermore, there is a differential thermal expansion between the metal wall of the housing, the glass bulb, and the asbestos, and for these reasons the packing cannot be relied upon to retain vapor evolved from the mercury, especially as such vapor may be at high pressure. For instance, when the thermometer is immersed in steam at 850° F. (a temperature used frequently in power plant work where superheated steam is generated), the mercury vapor would have a pressure of about fifty pounds per square inch above atmosphere. It is thus evident that mercury is not altogether suitable as the heat conducting medium between the housing and the bulb, and accordingly it has been proposed heretofore to replace the mercury in the well by a finely powdered substance, for instance graphite or copper, when the thermometer is to be used for high-temperature work.

Such material as graphite or copper may readily be obtained in finely powdered form and the powdered material freely enters the space between the bulb and housing and acts as a conductor of heat. However, when used in a thermometer of ordinary dimensions, the time lag of mercury is to that of powdered graphite approximately as 2.6 is to 9.7, although graphite greatly reduces the time lag as compared with an air gap.

It has also been proposed heretofore to fill the space about the bulb with a low-melting-point metal or metal alloy which becomes fluid at the range of temperature to be measured and which, in fluid condition, acts as a good conductor of heat between the housing and bulb, but when any of the usual metals or metal alloys are employed for the purpose, it is found that the contraction of the metal, upon cooling and solidifying, is frequently sufficient to crush the glass bulb, a result which is made even more certain by the contraction in diameter of the wall of the metal housing as the latter cools.

Under some conditions, as, for example, when the thermometer bulb is spherical and the wall of the housing is of a material, for example glass, having a small thermal coefficient of expansion, such an arrangement as that just suggested may be fairly dependable. However, the usual industrial thermometer has an elongate, substantially cylindrical bulb of a length usually from three to six times its diameter and which is not nearly so resistant to crushing as is a spherical bulb, and this elongate bulb is usually housed in a metal case which itself tends to contract appreciably in cooling; and with such an arrangement none of the usual fusible metals or metal alloys can be used without expectation that the thermometer bulb will be seriously damaged or actually crushed after a short period of use.

The object of the present invention is to improve industrial thermometers of the type above referred to by the use of a heat-transmitting medium interposed between the bulb and the housing and which has a greater heat conductivity than powdered graphite alone but which, on the other hand, will not exert crushing stress upon the thermometer bulb when the temperature drops. Obviously this improved heat-transferring medium must be of such character that it may readily fill the minute space, for example of the order of 0.010 inch thick, between the bulb and the wall of the housing; it must not vaporize at temperatures within the range to be measured; it must not have any corrosive or other injurious effect upon the wall of the housing; and it must be reliable, stable and permanent in composition and character.

Among the substances which have been found to possess the desired characteristics for this purpose are certain intimate mechanical mixtures of fusible metal or metallic alloys with a finely divided inert substance, that is to say, a substance which does not fuse within the temperature range to be measured; which does not combine or alloy with the metal to form a chemical compound or a solid infusible mass; and which does not change in character chemically or otherwise during use,—the fusible metal or metallic alloy preferably having a melting point such that it fuses at or below the lower limit of the temperature range to be measured but which does not boil or vaporize at or below the upper limit of such range.

Such a mechanical mixture of finely divided inert material with the fusible metal constitutes an effective conductor for heat, the conductivity increasing as the percentage of metal is increased and also with the fineness of division of the inert substance, but due to the inclusion of the finely divided material, the mass does not contract nearly so much in cooling or form so solid a body as would the selected fusible metal alone. Thus, in cooling, this heat-conducting material does not develop sufficient crushing stress to damage the glass bulb which is embedded within it.

While various inert materials may be employed for the purpose, including, for example, finely divided minerals, for instance fire-clay, as well as metals having a high melting point and no tendency to alloy with the fusible metal used, for example, powdered tungsten, it has been found that powdered graphite is very satisfactory for the purpose, although possibly not as good a heat conductor as some other materials, which, for example, are more expensive, less easy to reduce to a fine powder, or which have a greater tendency to combine with the fused metal to form a rigid and highly contractile mass.

Thus, for example, it has been found that a mixture consisting of 40% graphite powder and 60% tin powder (the percentage being by volume) gives very good results, the degree of conductivity of the mixture varying, as above pointed out, with the fineness of the powders employed. This latter is evidenced by comparison of the time lag when using powders of different fineness, the lag of the above percentage mixture in a thermometer of ordinary dimensions being 6.9 seconds when the powders used are of a 100 mesh fineness, while the time lag is 4.2 seconds when the powders are sufficiently fine to pass a 200 mesh screen.

Alloys of lead, tin, bismuth and cadmium may be obtained having melting points down to less than 160° F., while lead alone has a melting point of 620° F. Thus it is possible, by proper selection of the fusible metal employed, to adapt the heat-conducting mixture for use with almost any temperature range for which a glass bulb thermometer is appropriate.

While it is preferred to mingle the fusible metal and the inert material in the form of finely divided powders, it is possible to produce a suitable heat-conducting mixture by stirring the powdered inert material, for instance graphite, into the fusible metal while the latter is in a molten state, and then, after the mixture has cooled, powdering the mass and introducing the powder thus obtained into the space surrounding the thermometer bulb.

While a mixture comprising 40% graphite and 60% tin has been instanced as forming a desirable heat-conducting mixture which does not exert crushing stress upon the thermometer bulb in cooling, it is within the purview of the invention to employ mixtures in somewhat different proportions, although usually it is desirable that the graphite or other inert material form at least 40% of the entire mixture by volume.

In the accompanying drawing wherein the application of the invention is illustrated by way of example, Fig. 1 is a front elevation of an industrial thermometer of a usual type;

Fig. 2 is a fragmentary vertical section, to much larger scale, showing the lower portion of the thermometer and the bulb housing;

Fig. 3 is a horizontal section, substantially on the line 3—3 of Fig. 2 and to much larger scale, and suggestive of the appearance of the heat-conducting medium in a powdered form such as it may have before the thermometer has been exposed to its working range of temperatures; and Fig. 4 is a section similar to Fig. 3, but suggestive of the appearance of the heat-conducting substance after the thermometer has once been used.

Referring to the drawing, the numeral 1 designates the upper part of the case of a thermometer of industrial type, said case also comprising the lower part 2 provided, as is usual, with a screw-threaded nipple-like portion designed to be received in an appropriate opening in the apparatus in which the thermometer is to be used. The case of the thermometer also comprises the bulb housing 3 projecting down below the nipple member 2 so as to be exposed to the medium whose temperature is to be measured. This bulb housing 3 is hollow, forming an elongate vertical well for the reception of the bulb of the fluid-in-glass thermometer, the stem 4 of which extends up into the upper part of the thermometer case where it is exposed to view in front of a suitable scale 5.

As shown more in detail in Figs. 2 and 3, the bulb housing 3 is of tubular cylindrical form, closed at its lower end 3ª and provided at its upper end with an internally screw-threaded flange 3ᵇ by means of which it is removably secured to a complemental part of the thermometer case. The elongate, substantially cylindrical bulb 6 of the thermometer is disposed within the well-like cavity provided by the housing 3,—the bulb 6 being integral with the glass stem 4 and being filled with mercury or other suitable temperature-responsive fluid indicated at 7.

As illustrated to an exaggerated degree in Figs. 2 and 3, the bulb 6 of the thermometer is of a diameter somewhat less than the internal diameter of the well formed by the housing 3, this difference in diameter being a substantially necessary, though undesirable, feature for the reasons above pointed out.

As here illustrated, the space between the inner wall of the housing 3 and the bulb 6 is substantially filled with the heat-conducting medium 8. This heat-conducting medium, as already described, may initially consist of a mixture of very finely divided particles 8ª (Fig. 3) of a fusible metal, for example tin, lead or a metal alloy, and an inert substance such as graphite. Preferably these materials are reduced to powder of a fineness such as to pass a 200 mesh sieve, and after the thermometer bulb has been placed in the housing 3, this mixture of fine powder is packed into the space between the bulb and the inner wall of the housing so as to fill this space as completely as possible.

When the thermometer is put into use and the housing 3 is exposed to temperature of the range for which the thermometer is graduated, the fusible metal powder melts but still holds within its substance the fine particles of inert, non-fusible material. However, the fused metal forms what may be regarded as a continuous network or spongy mass providing a more or less unbroken metallic conductor leading from the wall of the housing to the bulb and which readily responds to fluctuations in temperature of the housing and transmits those fluctuations with a very low lag, for example 4.2 seconds, from the housing to the bulb. However, when the temperature drops, for example at the completion of the process for which the thermometer was employed, the fusible metal congeals, but, in so doing, its mass is so divided by the multitude of inert particles that it does not contract like a solid mass of the same metal and thus does not exert a compressive stress upon the thermometer bulb such as would crush the latter. When the thermometer is again put into use, the fusible metal again melts and again acts as a good conductor of heat between the housing and the bulb.

While certain desirable embodiments of the invention have been suggested by way of example, it is to be understood that the invention is not limited to these precise embodiments but is to be regarded as broadly inclusive of any and all modifications such as fall within the purview of the appended claims.

I claim:

1. A thermometer of the fluid-in-glass type designed for use in measuring temperatures above that of the boiling point of mercury, said thermometer having a stem and bulb and a protective metallic housing for the bulb, and a heat-conducting substance interposed between the bulb and the inner wall of said housing, characterized in that said heat-conducting substance comprises metal which is solid at room temperature but which fuses below the lower limit of the working range for which the thermometer is intended, and an inert material in finely divided form commingled with the metal and in sufficient proportion relative to the metal to prevent such contraction of the metal when it congeals as to injure the thermometer bulb.

2. A thermometer of the fluid-in-glass type designed for use within a temperature range whose lower limit is of the order of 675° F. or more, said thermometer having a stem and bulb and a protective housing for the bulb, and a heat-conducting substance interposed between the bulb and the inner wall of said housing, characterized in that said heat-conducting substance comprises metal which is solid at room temperature and an inert, non-metallic substance, each in powdered form and of a fineness of the order of at least 100 mesh, the metal being fusible at a temperature not substantially exceeding said lower limit of the working range for which the thermometer is designed.

3. A thermometer of the fluid-in-glass type designed for measuring temperatures within a range whose upper limit is above the temperature of the boiling point of mercury, said thermometer having a stem and bulb and a protective metallic housing for the bulb, and a heat-conducting substance interposed between the bulb and the inner wall of said housing, characterized in that said heat-conducting substance comprises two materials each of which at normal room temperature is in finely divided form, one of said materials being a metal which is fusible at the lower limit of the working range for which the thermometer is intended, and the other material being infusible at the upper limit of the working range for which the thermometer is intended, said latter material being of a nature such that it does not alloy nor form chemical compounds with the first material, the infusible material forming more than 40% of the substance.

4. A thermometer of the fluid-in-glass type designed for measuring temperatures within a range whose upper limit exceeds 675° F., said thermometer having a stem and an elongate, substantially cylindrical bulb and a protective metal housing for the bulb, and a heat-conducting substance interposed between the bulb and the inner wall of said housing, characterized in that said heat-conducting substance is a mixture of powdered metal and powdered graphite, the powders, when at room temperature, being finely divided the metal having a fusing point at least as low as the lower limit of the working range of the thermometer and forming less than 60% by volume of the mixture.

5. A thermometer of the fluid-in-glass type designed for measuring temperatures within a range whose upper limit exceeds 675° F., said thermometer having a stem and bulb and a protective housing for the bulb, and a heat-conducting substance interposed between the bulb and the inner wall of said housing, characterized in that said heat-conducting substance comprises metal which is solid at room temperature but which has a fusing point at least as low as the lower limit of the working range of the thermometer, and graphite powder of a fineness of approximately 200 mesh.

RUDOLF BECK.